United States Patent
Yi

(10) Patent No.: US 8,345,972 B2
(45) Date of Patent: Jan. 1, 2013

(54) METHOD FOR PROCESSING COLOR COMPONENT VALUES OF PIXEL

(75) Inventor: Wang-Cheng Yi, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 363 days.

(21) Appl. No.: 12/884,186

(22) Filed: Sep. 17, 2010

(65) Prior Publication Data

US 2012/0070079 A1 Mar. 22, 2012

(51) Int. Cl.
*G06K 9/00* (2006.01)
*G06K 9/40* (2006.01)

(52) U.S. Cl. .................................. 382/167; 382/274

(58) Field of Classification Search .................. 382/162, 382/167, 254, 274
See application file for complete search history.

(56) References Cited

U.S. PATENT DOCUMENTS

| 5,832,055 A * | 11/1998 | Dewaele | 378/62 |
| 7,421,118 B2 * | 9/2008 | Dalrymple | 382/167 |
| 2008/0130024 A1 * | 6/2008 | Kakutani | 358/1.9 |

* cited by examiner

*Primary Examiner* — Bernard Krasnic
(74) *Attorney, Agent, or Firm* — Winston Hsu; Scott Margo

(57) ABSTRACT

A method for processing a pixel having a plurality of color component values includes: utilizing a processing circuit to generate elements of a skin color correction matrix according to elements of a global color correction matrix and a predetermined value corresponding to the pixel; utilizing the processing circuit to generate elements of a current color correction matrix according to elements of the global color correction matrix, the skin color correction matrix and the color component values of the pixel; and adjusting the color component values of the pixel according to the elements of the current color correction matrix.

7 Claims, 4 Drawing Sheets

$$\text{SkinCCM} = \underbrace{\begin{bmatrix} 1.5079 & -0.1805 & -0.3274 \\ -0.3113 & 1.5520 & -0.2407 \\ -0.1175 & -0.3774 & 1.4947 \end{bmatrix}}_{\text{GlobalCCM}} \times \text{SkinWeight} + \underbrace{\begin{bmatrix} 1 & 0 & 0 \\ 0 & 1 & 0 \\ 0 & 0 & 1 \end{bmatrix}}_{\text{Identity matrix}} \times (1-\text{SkinWeight})$$

FIG. 2

$$\text{CurrentSkinCCM} = \frac{(16-\text{Skinvalue})}{16} \times \underbrace{\begin{bmatrix} 1.5079 & -0.1805 & -0.3274 \\ -0.3113 & 1.5520 & -0.2407 \\ -0.1175 & -0.3774 & 1.4947 \end{bmatrix}}_{\text{GlobalCCM}} + \frac{\text{Skinvalue}}{16} \times \text{SkinCCM}$$

FIG. 3

ID COLOR CORRECTION MATRIX FOR PIXEL

METHOD FOR PROCESSING COLOR COMPONENT VALUES OF PIXEL

BACKGROUND OF THE INVENTION

1. Field of the Invention

The present invention relates to image processing, and more particularly, to a method for processing color component values for the purpose of skin tone color correction.

2. Description of the Prior Art

Different camera equipment or lighting conditions may cause colors within captured images to deviate within a same scene. Sometimes, this color deviation gives skin tone an unnatural look, such as leading to an uncomfortably strong orange, yellow, or red tinge to the skin in an otherwise well balanced, natural looking image.

Therefore, skin tone colors within the captured images need to be adjusted or corrected.

SUMMARY OF THE INVENTION

With this in mind, the present invention provides a method for skin tone color correction. This correction is achieved by applying a color correction matrix to a color represented in the form of a color component value (R, G and B) matrix so that the color component values can be adjusted. According to the different lighting conditions and colors, the present invention adjusts colors belonging to skin tone within the captured image by various degrees. The determination of the color correction matrix is based upon the tendency of the color towards a red skin tone, and upon the lighting condition. Thus, for those colors which appear too red, the present invention prevents these colors from being oversaturated. In addition, the present invention also provides adjustable parameters for users to optimize the effect of color correction.

According to one exemplary embodiment of the present invention, a method for processing a pixel having a plurality of color component values is provided. The method comprises: utilizing a processing circuit to generate elements of a skin color correction matrix (skin CCM) according to elements of a global color correction matrix (global CCM) and a predetermined value corresponding to the pixel; utilizing the processing circuit to generate elements of a current color correction matrix (current skin CCM) according to elements of the skin CCM, the global CCM and the color component values of the pixel; and adjusting the color component values of the pixel according to the elements of the current skin CCM.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates how to determine a skin tone color correction matrix SkinCCM according to one exemplary embodiment of the present invention.

FIG. 3 illustrates how to determine a current skin tone color correction matrix currentSkinCCM according to one exemplary embodiment of the present invention.

DETAILED DESCRIPTION

Figure 1:
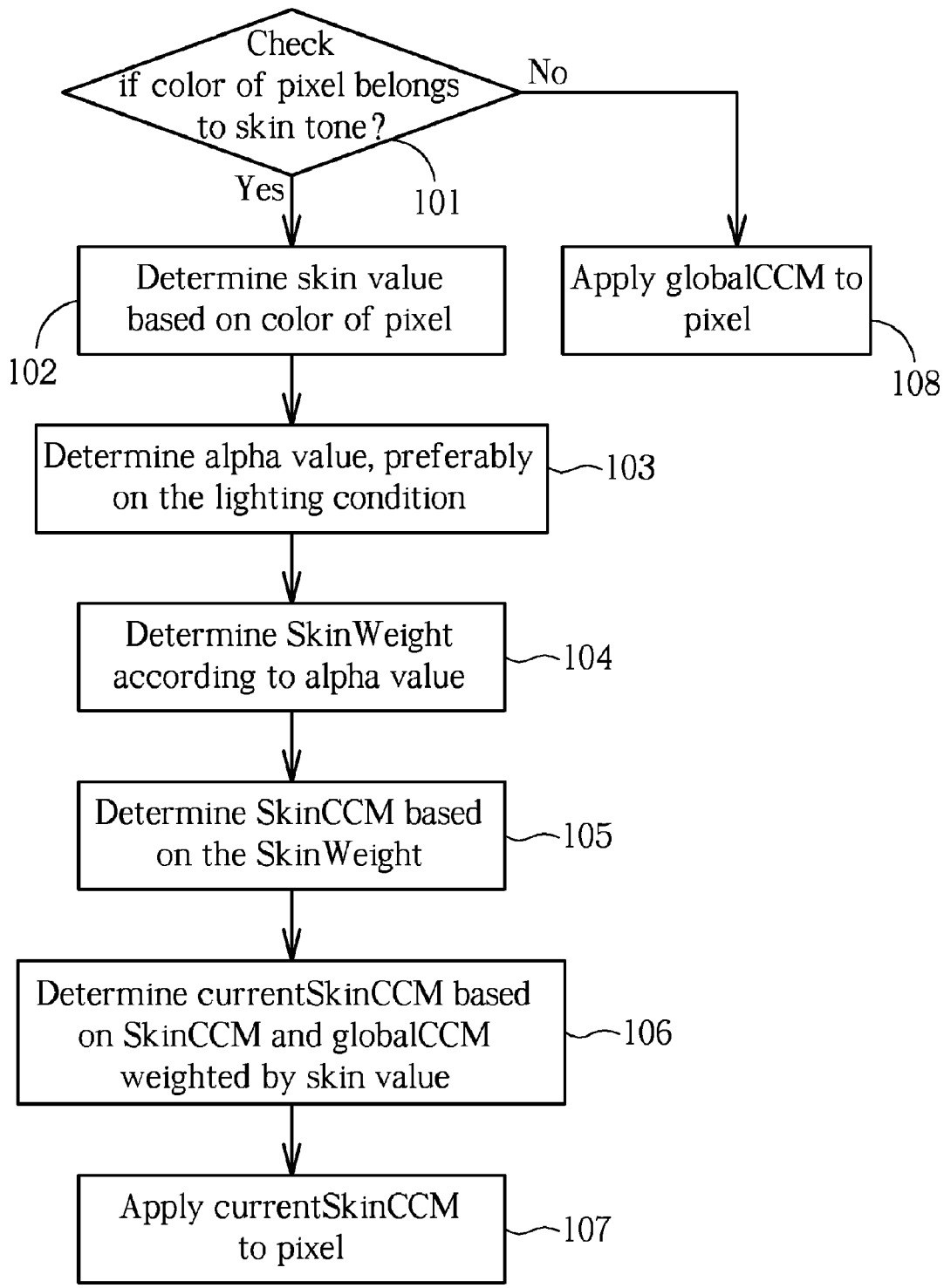
FIG. 1 illustrates a flow chart of a method for processing a pixel having a plurality of color component values according to one exemplary embodiment of the present invention.

Please refer to FIG. 1, which illustrates a flow chart of the inventive method according to one exemplary embodiment of the present invention. Provided that the result is substantially the same, the steps shown in the flow chart are not limited to be executed according to the exact order shown in FIG. 1. Additionally, only the steps pertinent to the present invention are shown in the flow chart of FIG. 1 for clarity and simplicity. In other exemplary embodiments, there are available steps that can be inserted between steps of the flow chart shown in FIG. 1.

In step 101, the inventive method firstly distinguishes whether a color of a pixel belongs to skin tone, wherein the pixel is within a captured image. In order to achieve this, the inventive method checks color component values of the color according to the following conditions:

$$R \geq G \qquad (a)$$

$$G \geq B \qquad (b)$$

$$R \leq \frac{RGth}{X} \times G \qquad (c)$$

$$G \leq \frac{GBth}{X} \times B \qquad (d)$$

Only when all the conditions (a)-(d) are met will the color be determined as belonging to skin tone. For condition (a), a color component value R of the color will be compared with a color component value G of the color; if R is greater than or equal to G, the condition (a) is met. For condition (b), the color component value G will be compared with a color component value B of the color; if G is greater than or equal to B, the condition (b) is met. For condition (c), the color component value R will be compared with a production of color component value G and a value $$\frac{RGth}{X},$$

wherein the value RGth is a predetermined parameter, which can be adjusted according to users' requirement. The value RGth will influence the result of determining whether the color belongs to skin tone. Thus, if the users desire to set up a wider or a narrower range of the standards of skin tone determination, the users can achieve this by changing the value RGth. If the users set up a wider range, more colors within the image will be determined as skin tone colors. In addition, the value of X may be variable with scales of the values RGth and GBth in different embodiments of the present invention; in a preferred exemplary embodiment, the value of X is 32. For condition (d), the color component value G will be compared with the production of color component value G and the value $$\frac{GBth}{X},$$

wherein GBth is also a predetermined parameter, which also influences the result of skin tone determination and can be modified according to users' requirements. If one of the conditions (a)-(d) is not met, the color will not be determined as belonging to skin tone. According to the result of the skin tone determination, if the color belongs to skin tone, the method executes step 102; otherwise, the method executes step 108, which directly applies a global color correction matrix GlobalCCM to the color of the pixel.

In a preferred embodiment of the present invention, the global color correction matrix GlobalCCM may be:

$$\begin{bmatrix} 1.5079 & -0.1805 & -0.3274 \\ -0.3113 & 1.5520 & -0.2407 \\ -0.1175 & -0.3774 & 1.4947 \end{bmatrix}$$

It should be noted, however, that elements of the global color correction matrix GlobalCCM may be different in other exemplary embodiments of the present invention, and the above-mentioned case is just for illustrative purposes rather than as a limitation. Thus, in step 108, according to the global color correction matrix GlobalCCM, the color that does not belong to the skin tone will be adjusted according to the following equation.

$$\begin{bmatrix} R' \\ G' \\ B' \end{bmatrix} = \begin{bmatrix} 1.5079 & -0.1805 & -0.3274 \\ -0.3113 & 1.5520 & -0.2407 \\ -0.1175 & -0.3774 & 1.4947 \end{bmatrix} \begin{bmatrix} R \\ G \\ B \end{bmatrix}$$

As shown above, the color in the form of R, G, and B color component values is represented in a 3×1 matrix at the right side of the above equation, and by the global color correction matrix GlobalCCM, the color is adjusted as an adjusted color in the form of R', G' and B' color component values.

In step 102, a skin value of the color belonging to skin tone will be determined. The skin value is used to grade the tendency of the color towards red skin tone, which can be determined by a minimum value $V_{min}$ from a group consisting of values (R–G), (G–B), $$\left(\frac{RGth}{X} \times G - R\right), \left(\frac{GBth}{X} \times G - B\right),$$

and Y, wherein the values of X and Y may be variable with scales of the values RGth and GBth, and in a preferred exemplary embodiment, the value of X is 32 while the value of Y is 16. Accordingly, the skin tone colors of East Asian people will have greater skin values than those of black people. The skin value will influence how the invention adjusts the color of the pixel belonging to skin tone as will be illustrated later. In short, if the skin value of the color is high, the effect of the color correction performed upon the color will be relatively strong. If the skin value of the color is low, the effect of the color correction performed upon the color will be relatively weak.

In step 103, a predetermined value α will be selected. In a preferred embodiment of the present invention, the predetermined value α may correspond to the lighting condition in which the image is captured; however, in other embodiments of the present invention, the predetermined value α may be directly selected by the users to meet their requirements. That is, the predetermined value α may be adjustable by users or selected according to the lighting condition.

In step 104, the inventive method determines a weighting factor SkinWeight, which will be further utilized in step 105 as will be illustrated later. The weighing factor SkinWeight makes the color correction take the predetermined value α into consideration (i.e. if the predetermined value α corresponds to the lighting condition, the color correction is therefore able to take the lighting condition into consideration). In the exemplary embodiment of the present invention, the weighing factor SkinWeight is determined by the following equation:

SkinWeight=α×SkinWeight_1+(1−α)×SkinWeight_0

If the predetermined value α is relatively high (e.g. in a high lighting condition), the weighting factor SkinWeight is mainly dominated by the value SkinWeight_1; otherwise (e.g. in a low lighting condition), the weighting factor SkinWeight is mainly dominated by the value SkinWeight_0. The users can choose appropriate values for SkinWeight_1 and SkinWeight_0 for high and low lighting conditions to obtain the best effect of the color correction. Moreover, if the predetermined value α corresponds to other factors, the users still can choose appropriate values for SkinWeight_1 and SkinWeight_0 to obtain the desired effect of the color correction.

In step 105, a skin tone color correction matrix SkinCCM for the color correction is determined. FIG. 2 illustrates how to determine the skin tone color correction matrix SkinCCM according to one exemplary embodiment of this invention. As can be seen from FIG. 2, the skin tone color correction matrix SkinCCM is determined by blending the global color correction matrix GlobalCCM with an identity matrix according to the weighting factor SkinWeight. That is, a weighted average is performed upon the elements of the GlobalCCM and elements of the identity matrix according to the weighting factor SkinWeight and the weighting factor (1−SkinWeight). In this embodiment, the skin tone color correction matrix SkinCCM will not be directly utilized for adjusting skin tone color; instead, the skin tone color correction matrix SkinCCM will be further utilized for generating a current skin tone color correction matrix currentSkinCCM. This current skin tone color correction matrix currentSkinCCM is determined according to the color component values of the color to be adjusted. The determination of currentSkinCCM will be different for each color within the image. Thus, the utilization of currentSkinCCM has a better effect on the whole image than utilization of SkinCCM, since the determination of currentSkinCCM takes the color component values into consideration while the determination of SkinCCM merely takes the lighting condition into consideration. However, in other exemplary embodiments of the present invention, it is also possible to directly apply SkinCCM to the color belonging to skin tone for color correction.

Moreover, as can be seen from FIG. 2, if the weighting factor SkinWeight is relatively small, the skin tone color correction matrix SkinCCM tends to be the identity matrix, and therefore, the skin tone color correction matrix SkinCCM has a slight influence upon the color (that is, the color changes slightly). However, if the weighting factor SkinWeight is relatively large, the skin tone color correction matrix SkinCCM has a significant influence upon the color (that is, the color changes significantly). The matrix blending by weighting average in the present invention simplifies the process of determining the skin tone color correction matrix SkinCCM. A user can arbitrarily change the effect of the skin tone color correction by adjusting the values SkinWeight_0 and SkinWeight_1 to let the weighting factor SkinWeight change elements of the skin tone color correction matrix SkinCCM rather than by individually finding each appropriate element of the skin tone color correction matrix SkinCCM. The user can achieve this simple process by inputting appropriate values for SkinWeight_1 and SkinWeight_0 under a test mode. The test mode allows the user to view the changes of the image immediately after the values for SkinWeight_1 and SkinWeight_0 are inputted. Once the user feels the values of SkinWeight_1 and SkinWeight_0 cause the color to have a more natural look, the values of SkinWeight_1 and SkinWeight_0 can be determined.

Figure 4:
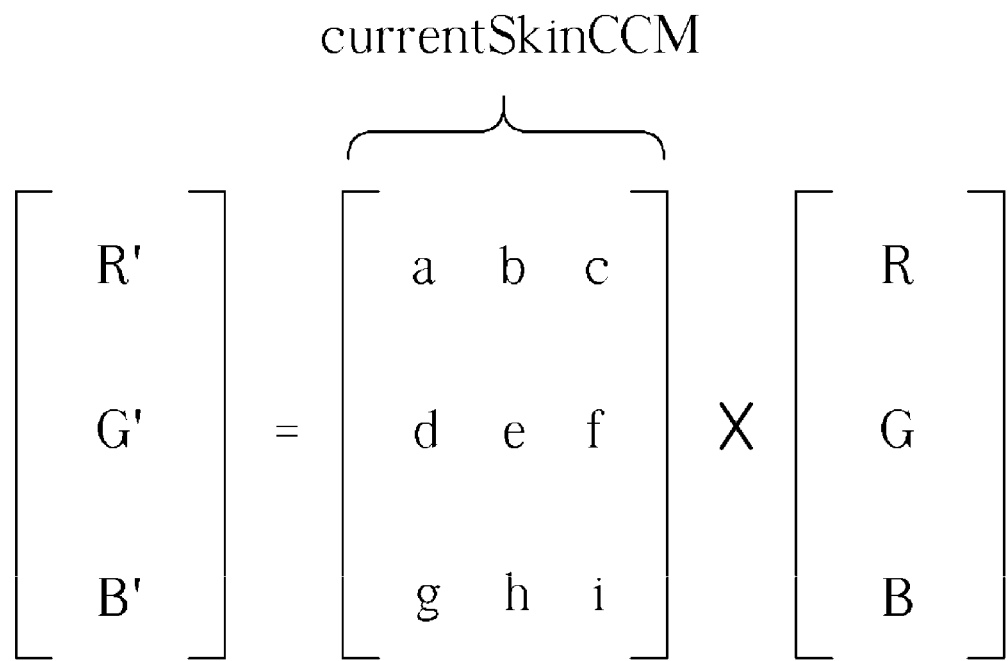
FIG. 4 illustrates how to apply a current skin tone color correction matrix currentSkinCCM to color component values for color correction according to one exemplary embodiment of the present invention.

After step 106 is completed, the inventive method executes step 107. In step 107, the skin tone color correction matrix SkinCCM is blended with the global color correction matrix GlobalCCM by the weighting average according to the skin value (as a weighting factor) determined in step 102 to determine the current skin tone color correction matrix currentSkinCCM. FIG. 3 illustrates a detailed process for determining currentSkinCCM. As can be seen from FIG. 3, the skin value makes the skin tone color correction take into consideration the tendency of the color towards a red skin tone. Via this blending, if the color has a relatively large skin value (i.e., more red), the currentSkinCCM that is to be applied will mostly be determined by the skin tone color correction matrix SkinCCM; otherwise, the currentSkinCCM that is to be applied to the color will mostly be determined by the global color correction matrix GlobalCCM. In other words, the larger the skin value, the more influence SkinCCM will have on the color; the smaller the skin value, the more influence GlobalCCM will have on the color. FIG. 4 illustrates how to apply a current skin tone color correction matrix currentSkinCCM to color component values for color correction according to one exemplary embodiment of the present invention. The color component values in the form of a 3×1 matrix is multiplied by the currentSkinCCM to generate the corrected color component values in the form of a 3×1 matrix.

Because the skin tone color correction matrix SkinCCM is derived from the weighting average on the identity matrix and the global color correction matrix GlobalCCM, GlobalCCM always has a stronger effect than that of SkinCCM. Thus, by appropriate determination, SkinCCM can have the strongest restraining capability for red components of color than that of GlobalCCM. Therefore, the current skin tone color correction matrix currentSkinCCM can make a color that is too red have a more natural look when the skin value is high.

One advantage of the utilization of the current skin tone color correction matrix currentSkinCCM is that the continuity of the whole captured image is maintained after the colors belonging to skin tone are adjusted. Via the current skin tone color correction matrix currentSkinCCM, skin tone colors are adjusted in varying degrees according to their skin values. Thus, not all skin tone colors are adjusted by the skin tone color correction matrix SkinCCM, which has the strongest effect on red components. Most skin tone colors are adjusted by the current skin tone color correction matrix currentSkinCCM, which has a weaker effect on red components. Therefore, the differences between non skin tone colors and skin tone colors can be reduced. The users will not notice sudden changes at boundaries between non skin tone colors and skin tone colors when viewing the corrected image; the continuity of the whole image can be maintained.

The inventive method may be implemented with different hardware architecture. For example, in one exemplary embodiment, a storage device (e.g. flash memory) for storing programs corresponding to the inventive method and a processing circuit (e.g. digital signal processor (DSP)) for executing computation corresponding to the inventive method is an example of a possible hardware architecture. However, this is just for illustrative purposes rather than as a limitation. There are many other possible hardware architectures for implementing the inventive method.

It should be noted that reference in the specification to "one exemplary embodiment" or "an embodiment" means that a particular feature or characteristic described in connection with the exemplary embodiment is included in at least an implementation. The appearances of the phrase "in one exemplary embodiment" in various places of the specification are not necessarily all referring to the same exemplary embodiment. Thus, although exemplary embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, the present invention provides a color correction method especially for colors belonging to skin tone. Via the present invention, color deviations due to the camera equipment and the lighting condition can be reduced for supplying users with a natural looking correction image.

Those skilled in the art will readily observe that numerous modifications and alterations of the device and method may be made while retaining the teachings of the invention.

What is claimed is:

1. A method for processing a pixel having a plurality of color component values, comprising:
   utilizing a processing circuit to generate elements of a skin color correction matrix (skin CCM) according to elements of a global color correction matrix (global CCM) and a predetermined value corresponding to the pixel;
   utilizing the processing circuit to generate elements of a current skin color correction matrix (current skin CCM) according to elements of the global CCM, the skin CCM and the color component values of the pixel; and
   adjusting the color component values of the pixel according to the elements of the current skin CCM.

2. The method of claim 1, wherein the step of utilizing the processing circuit to generate the elements of the skin CCM comprises:
   determining a first weighting factor and a second weighting factor according to the predetermined value corresponding to the pixel; and
   generating the elements of the skin CCM by performing a weighted average operation upon the elements of the global CCM and elements of a Identity matrix according to the first weighting factor and the second weighting factor.

3. The method of claim 2, wherein the step of determining the first weighting factor and the second weighting factor comprises:
   determining a third weighting factor and a fourth weighting factor according to the predetermined value;
   generating the first weighting factor by performing a weighted average operation upon a first value and a second value according to the third weighting factor and the fourth weighting factor, wherein the first value and the second value are predetermined; and
   determining the second weighting factor according to the first weighting factor.

4. The method of claim 3, wherein the predetermined value is selected according to a lighting condition corresponding to the pixel.

5. The method of claim 1, wherein the step of utilizing the processing circuit to generate elements of the current Skin CCM according to elements of the global CCM, the skin CCM and the color component values of the pixel comprises:

determining a first weighting factor and a second weighting factor according to the color component values of the pixel; and generating the elements of the current skin CCM by performing a weighted average operation upon the elements of the global CCM and the elements of the Skin CCM according to the first weighting factor and the second weighting factor.

6. The method of claim 5, wherein the color component values of the pixel include a red component value R, a green component value G and a blue component value B, and the step of determining the first weighting factor and the second weighting factor comprises:

selecting a minimum value $V_{min}$ from a group consisting of (R−G), (G−B), $$\left(\frac{RGth}{X} \times G - R\right), \frac{GBth}{X} \times B - G,$$

and Y; and determining the first weighting factor and the second weighting factor according to the minimum value $V_{min}$ and Y, wherein X and Y are predetermined values and wherein RGth and GBth are also predetermined parameters.

7. The method of claim 1, wherein the color component values of the pixel include a red component value R, a green component value G and a blue component value B, and the method further comprises:

checking following conditions (a)-(d):

$$R \geq G; \tag{a}$$

$$G \geq B; \tag{b}$$

$$R \leq \frac{RGth}{X} \times G; \text{ and} \tag{c}$$

$$G \leq \frac{GBth}{X} \times B; \tag{d}$$

wherein the step of adjusting the color component values of the pixel according to the elements of the current skin CCM is executed only when all of the conditions (a)-(d) are met, wherein X, RGth, and GBth are predetermined parameters.

* * * * *

UNITED STATES PATENT AND TRADEMARK OFFICE
CERTIFICATE OF CORRECTION

PATENT NO. : 8,345,972 B2
APPLICATION NO. : 12/884186
DATED : January 1, 2013
INVENTOR(S) : Wan-Cheng Yi It is certified that error appears in the above-identified patent and that said Letters Patent is hereby corrected as shown below:

On the title page, item (75), correct the name of the inventor from "Wang-Cheng Yi" to --Wan-Cheng Yi--.

Signed and Sealed this
Second Day of April, 2013

Teresa Stanek Rea
*Acting Director of the United States Patent and Trademark Office*